United States Patent
Ryan et al.

(10) Patent No.: US 7,577,634 B2
(45) Date of Patent: Aug. 18, 2009

(54) METHOD AND APPARATUS FOR AUTOMATICALLY PROVIDING EXPERT ANALYSIS-BASED ADVICE

(75) Inventors: Patrick G. Ryan, Chicago, IL (US); Kalyan R. Madhavan, Bloomingdale, IL (US); W. Thomas C. Bergerson, Chicago, IL (US); Kristian J. Hammond, Chicago, IL (US); Lawrence A. Birnbaum, Evanston, IL (US)

(73) Assignee: First Look Networks LLC, Chicago, IL (US)

( * ) Notice: Subject to any disclaimer, the term of this patent is extended or adjusted under 35 U.S.C. 154(b) by 426 days.

(21) Appl. No.: 10/912,508

(22) Filed: Aug. 5, 2004

(65) Prior Publication Data

US 2006/0031182 A1 Feb. 9, 2006

(51) Int. Cl.
  *G06N 5/00* (2006.01)
  *G06N 5/04* (2006.01)
(52) U.S. Cl. .................................. 706/50; 706/46
(58) Field of Classification Search ................ 706/45, 706/46, 47, 50; 702/189; 705/10, 11, 22
  See application file for complete search history.

(56) References Cited

U.S. PATENT DOCUMENTS

| | | | | |
|---|---|---|---|---|
| 4,837,689 A | * | 6/1989 | Tanaka et al. ................. | 704/8 |
| 4,891,766 A | * | 1/1990 | Derr et al. ................... | 706/60 |
| 5,197,116 A | * | 3/1993 | Katoh et al. ................. | 706/48 |
| 5,301,260 A | * | 4/1994 | Miyashita .................... | 706/50 |
| 5,481,647 A | * | 1/1996 | Brody et al. ................. | 706/11 |
| 5,899,985 A | * | 5/1999 | Tanaka ....................... | 706/45 |
| 6,182,059 B1 | * | 1/2001 | Angotti et al. ............... | 706/45 |
| 6,535,863 B1 | * | 3/2003 | O'Reilly ..................... | 706/45 |
| 6,741,975 B1 | * | 5/2004 | Nakisa et al. ................ | 706/47 |
| 2002/0007356 A1 | * | 1/2002 | Rice et al. ................... | 706/47 |
| 2002/0194051 A1 | * | 12/2002 | Hall et al. ................... | 705/10 |
| 2003/0144977 A1 | * | 7/2003 | Suda et al. .................. | 706/46 |
| 2003/0220830 A1 | * | 11/2003 | Myr ............................ | 705/10 |
| 2004/0039630 A1 | * | 2/2004 | Begole et al. ............... | 705/11 |
| 2004/0260667 A1 | * | 12/2004 | Huelsman et al. ........... | 706/47 |

OTHER PUBLICATIONS

PCT "International Search Report", received on Dec. 8, 2006, for counterpart International Patent Application No. PCT/US05/28074.

* cited by examiner

*Primary Examiner*—David R Vincent
*Assistant Examiner*—Adrian L Kennedy
(74) *Attorney, Agent, or Firm*—Sidley Austin LLP

(57) ABSTRACT

The present invention is directed to a computer-based intelligent adviser having particular applicability in industry situations and job positions in which analytical skills are secondary to a position but in which analytical skills are important to achieving the highest level of performance in the business. The present invention contemplates both the process of developing a computer based intelligent adviser as well as a system and process of using a computer-based intelligent adviser.

23 Claims, 10 Drawing Sheets

Jerry's Used Car Scorecard — 631

Week ending: January 31, 2004
Week #: 5

Overall Unit Sales

January: 81   February: 75   Sep-Nov Avg: 69

Overall — 634

- Retail performance boosted by improvement with purchased inventory.
- Purchased vehicles = 49% of inventory, 57% of sales, 65% of profitability
- Trade-ins underperforming due to large number of high risk Trade-ins in inventory

| | Target | Trend | 12 wk avg |
|---|---|---|---|
| Retail Avg Gross Profit | $1,800 | $1,492 | $1,416 |
| F & I Avg Gross Profit | $1,000 | $885 | $1,041 |
| % Sell Through | 90% | 78% | 72% |
| Avg Days to Retail Sale | 25 | 23 | 28 |
| | | Current | Prior |
| Avg Inventory Age | 25 | 34 | 32 |
| Avg Days Supply | 45 | 43 | 47 |

Aging Inventory — 635

- Excessive 50+ day inventory (21% of total) underwater ($28,620) vs. book
- Danger: Large inventory bubble 40-49 days; already ($23,625) underwater vs. book
- 39% of aging inventor is old, high mileage
- Aging inventory not selling well; only 23% of inventory > 30 days old sells by 60 days

| | Target | Trend | 12 wk avg |
|---|---|---|---|
| % Off wholesale cliff (>60 days) | $1,800 | $1,492 | $1,416 |
| % Off retail cliff (50-59days) | $1,000 | $885 | $1,041 |
| % Off retail cliff (40-49 days) | 90% | 78% | 72% |
| % near retail cliff (30-39 days) | 25 | 23 | 28 |

Jerry's — 633

Purchased Vehicles — 637

- Performance improvement driven by purchasing higher % of winners
- Certified Accord EX $564 more profitable than Certified Accord
- Certified vehicles sell 10 days faster
- Potential opportunity: $6-8K coupes = 55% of coupe profitability; 17% of inventory
- Overstocking risk: 79 day supply of SUVs

| | Target | Trend | 12 wk avg |
|---|---|---|---|
| % winners | Over 80% | 63% | 71% |
| Retail Avg Gross Profit | $1,800 | $1,725 | $1,591 |
| % Sell Through | 90% | 86% | 78% |
| Avg Days to Retail Sale | 25 | 17 | 24 |
| | | Current | Prior |
| Avg Inventory Age | 25 | 27 | 31 |

Trade-Ins — 638

- Excessive mileage risk: 15+K per year cars are 47% of inventory, but gross profit only $517
- Low trade-in sell through: 31% wholesaled as aged inventory at ($1,024) average loss
    annualized loss = ($181,350)
- High mileage cars impacting profitability, sell through, and days to sale
- Avg aged inventory wholesale loss increasing

| | Target | Trend | 12 wk avg |
|---|---|---|---|
| % non-winners wholesaled | Over 80% | 29% | 39% |
| Retail Avg Gross Profit | $1,800 | $1,059 | $1,204 |
| % Sell Through | 90% | 66% | 69% |
| Avg Days to Retail Sale | 25 | 34 | 32 |
| | | Current | Prior |
| Avg Inventory Age | 25 | 39 | 35 |

Wholesale — 639

| Avg Gross Profit | Target | Trend | 12 wk avg |
|---|---|---|---|
| Immediate Wholesale | $1,800 | $1,492 | $1,416 |
| Aged inventory | $1,000 | $885 | $1,041 |

Fig. 6B

```xml
<inference id='1'>
    <name>
        Retail AGP with Source Channel Breakdown
    </name>
    <doc>
        Created by RuleEdit tool.
    </doc>
    <rule>
        <rule_1>
            <and>
                <gt>
                    <value>
                        percentratio_used_overall_avggross_6weeks_vs_used_overall_avggross_12weeks
                    </value>
                    <threshold>
                        Rule_1_Threshold_1
                    </threshold>
                </gt>
                <gt>
                    <value>
                        percentratio_used_purchased_avggross_6weeks_vs_used_overall_avggross_12weeks
                    </value>
                    <threshold>
                        Rule_1_Threshold_2
                    </threshold>
                </gt>
            </and>
        <rule_1>
    </rule>
    ...
</inference>
```

Fig. 9

```xml
<derivation id='1'>
    <name>
        Mul_used_tradein_nosaleprofit_6weeks_vs_Rule_1_Target_6
    </name>
    <doc>
        Created by RuleEdit tool.
    </doc>
    <func>
        Mul
    </func>
    <variable_a vehicleType="used"
            sourcingChannel="tradein"
            sellingChannel="nosale"
            measure="avggross"
            timePeriod="6weeks" >
        used_tradein_nosaleprofit_6weeks
    </variable_a>
    <variable_b target="true">
        Rule_1_Target_6
    </variable_b>
    <result>
        Mul_used_tradein_nosaleprofit_6weeks_vs_Rule_1_Target_6
    </result>
</derivation>
```

Fig. 10

METHOD AND APPARATUS FOR AUTOMATICALLY PROVIDING EXPERT ANALYSIS-BASED ADVICE

FIELD OF THE INVENTION

The present invention generally relates to methods and apparatus for providing advice for making business decisions and more particularly to a tool for efficiently analyzing available data and automatically generating expert advisories based on that analysis.

BACKGROUND OF THE INVENTION

It has become an undeniable reality of the information age that the availability of computers to collect and process all manner of business data has increased the efficiency with which a business or organization can be operated. While vast quantities of raw information are available, the information must be analyzed before it can be used to support business decision-making. However, many companies do not have employees with the time, skill, sophistication, or analytical capability to analyze the available data. As a result, many businesses use a mere fraction of the data available to them. Most modern businesses could be operated more productively and more efficiently if the data that is available to such companies was analyzed to support decision-making.

As personal computers have become widely available, data analysis tools have also become more prevalent. Relatively simple tools are widely available on personal computers, including spreadsheet programs such as Excel, QuattroPro, or Lotus. Other tools include highly sophisticated custom applications, which require extensive training before they can be used productively. While personal computer spreadsheet programs are widely available at a relatively low cost, they are not suitable for large scale data analysis to support business decision-making. For example, the typical home or business spreadsheet user is not able to exploit even a tiny fraction of the processing capability of such programs. Further, most users are not capable of using the sophisticated mathematical functions, database operations, graphing capabilities or programming features available in most spreadsheets. However, effective use of a spreadsheet for data analysis may require more knowledge of such features, as well as of data analysis techniques than the typical user possesses. Moreover, a spreadsheet may be inadequate for analyzing large volumes of data.

Another class of computer applications for data analysis and presentation, which are more sophisticated than mere spreadsheets are so-called business intelligence and performance management applications. Examples of such applications include programs developed by companies such as Crystal Decisions, Business Objects, Hyperion Solutions, Brio Software, and Cognos. Such programs are enterprise applications that facilitate the collection and storage of the vast volume of data in an organization and turn it into a meaningful presentation that people can use in their day-to-day activities. For example, the application can include reporting and querying software, as well as the ability to analyze business data from multiple databases and other data sources.

A commonly available interface with such applications are so-called dashboard displays which are designed to interface with existing database programs and provide an overview of the data being reported. Such systems may include the ability to rank, sort or filter the data; to drill down to related reports or underlying data sources; to link to forecasts or projections; or to highlight data values which are outside of expected ranges. As such, the dashboard provides a convenient interface for summarizing volumes of data and for browsing and explaining the basis of the summarized data. Critically, however, even with a dashboard display, such business intelligence applications require a high degree of training and sophistication by the user. Thus, the average user is unlikely to be able to make effective use of such sophisticated applications without full time support by an expert.

Expert systems are yet another class of systems or computer applications available to assist in making decisions. An expert system is a system, or application, that attempts to encapsulate in a computer program the knowledge and reasoning or diagnostic skills of an expert and then to apply that knowledge to reason about data available to the expert system. The system may infer new facts based on the data, recommend a course of action, diagnose an illness, or other task, by using the encapsulated knowledge. Generally, expert systems are rule-based, that is they function by applying rules obtained with the assistance of an expert, to facts available to the expert system. Rules used in an expert system are generally in the form of "If-Then" rules. A rule such as "if A then B" means that if "A" is true, then the conclusion "B" may be inferred to be true, where "B" may be a fact to assert or an action to be taken. A rule in a medical diagnostic system might be "if the patient has both a fever and headache, then the patient may have the flu." Thus, the "If-Then" rule describes a problem situation and the diagnosis or action an expert would perform in that situation.

At the heart of an expert system is a so-called "inference engine," which is the processing portion of an expert system. With information from a knowledge base, the inference engine provides the reasoning ability that derives inferences (conclusions) on which the expert system acts. Typically, an inference engine examines each inference rule in turn to determine if the predicate, e.g., the 'If' portion, of the rule is true based on the facts 'known' to the expert system. If the predicate is true then the consequent, e.g., the 'Then' portion, of the rule is executed. Often the consequent asserts a new fact that can be 'inferred' from the predicate. For example, given the facts:

precipitating=true,
    temperature=0
    freezing=32 and a rule:
    if precipitating and temperature<freezing then snowing=true then the inference engine may infer that it is snowing, and assert a new fact:
    snowing=true.

Typically, changing the facts known to the inference engine causes the inference engine to reprocess all of the rules. This can adversely impact performance of the expert system. To minimize any impact, rule authors must consider both the logic of the rules as well as the operational impact of the rules. A rule author may need to order the rules in the knowledge base to control the order in which rules are processed, e.g., so that rules with expensive computations or rules that have a low probability of being invoked are run last. A rule author may also need to segregate the rules into groups so that some rules are only activated when certain facts are known. In the example supra, different set of rules may be activated depending on whether the temperature is above or below freezing. The need to consider both the operational and logical implications of each rule increases the difficulty of creating a conventional expert system.

While expert systems can provide tremendous assistance to organizations by allowing a lay operator to make use of expert knowledge, such systems tend to be very expensive to build because of the difficulty in building the rule sets. Moreover, rule sets for conventional expert systems tend to be fragile. Because the rules impact both logical and operational aspects of the expert system, making changes to one rule may impact how and when many other rules are applied. Thus, a deep understanding of the entire rule base is needed before modifying the rules. This makes maintenance and enhancement of a typical expert system expensive and somewhat problematic. Because of the fragile nature of typical expert systems, a person using the expert system often ceases to be involved in decision making and, instead, merely becomes a technician that operates the expert system.

In view of the shortcomings of the prior art there exists a need for a process and system which can enable analytical, but non-technical, people to interact with an expert system at a level that provides a high level of analytical sophistication but that is abstracted from the technical details of the expert system. Further, there exists a need for a process and system that assists non-analytical people in performing in an analytically sophisticated manner. Further, there exists a need for a process and system which can move the use of business intelligence tools beyond the current group of sophisticated power users. Further there exists a need for a process and system which can assist non-analytical people with analysis-based decision-making support while not merely substituting the judgement of the business person with the judgment of an expert system. Further, there exists a need for a process and system which can operate as an intelligent advisor to assist a non-analytical person in performing his job according to best practices in the industry without requiring the person to become analytically sophisticated. Further, there exists a need to provide a simple, robust, inexpensive analytical tool for use by organizations with insufficient recourses to create custom made tools.

BRIEF SUMMARY OF THE INVENTION

The present invention is directed to a computer-based intelligent adviser having particular applicability in job situations and positions in which analytical skills are secondary to other job skills, yet analytical skills are nevertheless important to job performance. The present invention contemplates both the process of developing a computer based intelligent adviser as well as a system and process of using a computer-based intelligent adviser.

The process of developing the computer based intelligent adviser begins within an analysis of the relevant business, including quantitative analysis, qualitative analysis, and statistical analysis of already available business data. It may also include an empirical study to determine the best practices in the industry, as well as to identify barriers which may prevent the use of the best practices. Preferably, the analysis identifies trends and relationships in the business data and determines key metrics of successful business performance.

To effectively use the results of the analysis, a set of data models or data calculations are developed to automate the analysis of operational data so that the analysis is repeatable. A set of rules based on the analysis are also developed for providing advisories based on the results of the data calculations. The rules are preferably grouped and prioritized to determine which data model outputs should be presented to a user.

In another aspect of the invention, effective means of communicating the analytical results to an operator are developed. Analytic and statistic analysis are traditionally presented in financial or mathematical terms including statistical terms, such as variance and deviation, or through graphs and plots. The typical user may lack the skills, aptitude, or education needed to assess information in such a traditional format. Accordingly, the present invention preferably provides an output into a form, format, and language style more readily grasped by the typical operator.

BRIEF DESCRIPTION OF THE DRAWINGS

The objects and advantages of the present invention will be apparent upon consideration of the following detailed description, taken in conjunction with the accompanying drawings, in which like characters refer to like parts throughout, and in which:

FIGS. 6A and 6B are illustrative screen displays showing the output of the system of FIG. 4 for, respectively, the used car and new car divisions of an exemplary car dealership;

FIG. 9 is an exemplary rule for use by the inference module of FIG. 4; and FIG. 10 is an exemplary rule for use by the derivation module of FIG. 4.

DETAILED DESCRIPTION OF THE INVENTION

Figure 1:
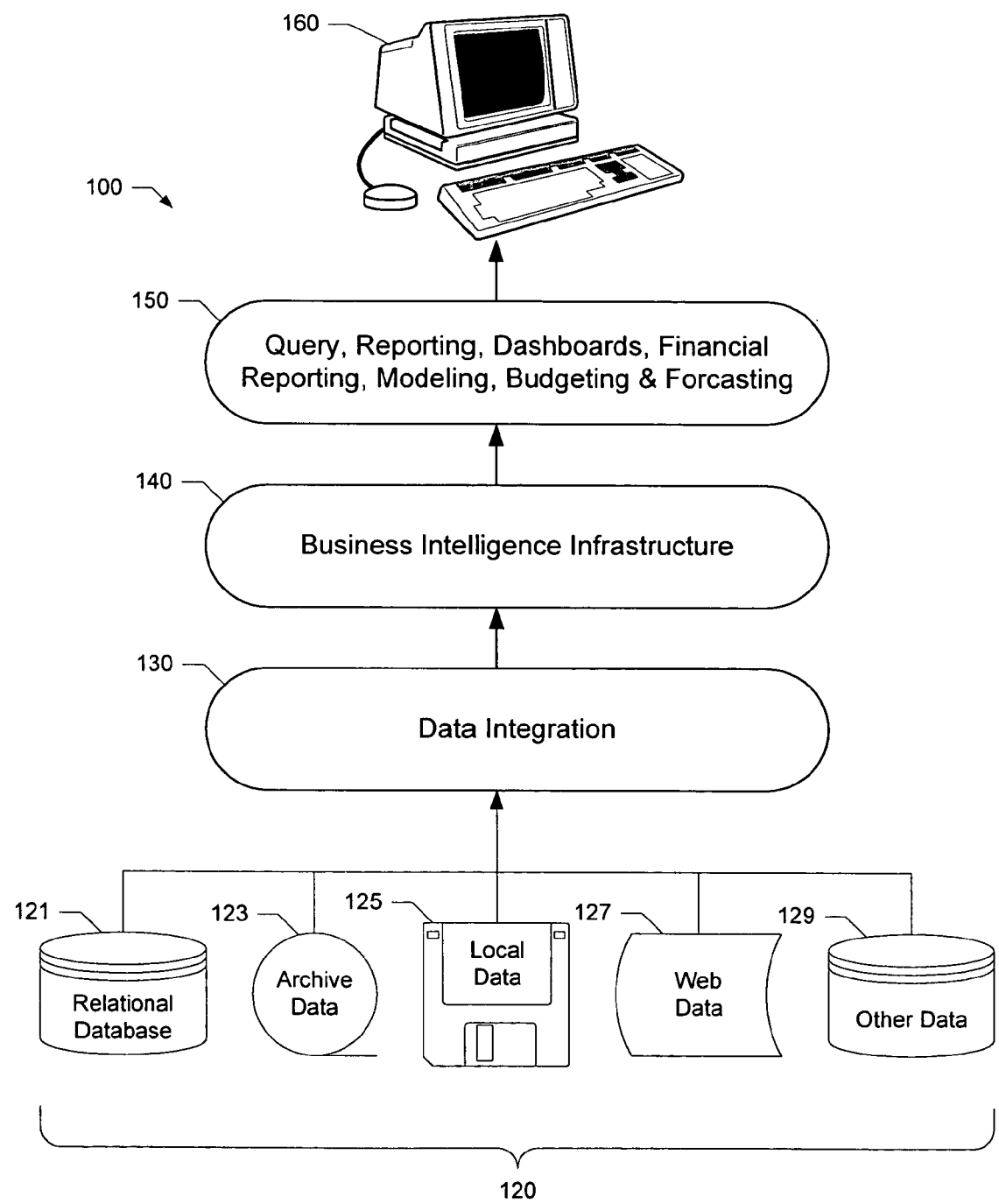
FIG. 1 is a simplified diagram of a prior art business intelligence system.

FIG. 1 generally illustrates prior art business intelligence system 100. As shown in FIG. 1, business intelligence system 100 draws data from a plurality of data sources 120 including relational database 121, archive storage 123, local data 125, web data 127, and other dated sources 129. Information from data sources 120 may be integrated together in an intermediate database or other data structure 130. Business intelligence infrastructure 140 provides a mechanism to link business intelligence system 100 to pre-existing or legacy data sources. Some business intelligence systems provide applications 150 to provide capabilities such as data querying, data reporting, financial reporting, data modeling, and budgeting and forecasting. Computer 160 provides an interface for interacting with business intelligence system 100.

Figure 2:
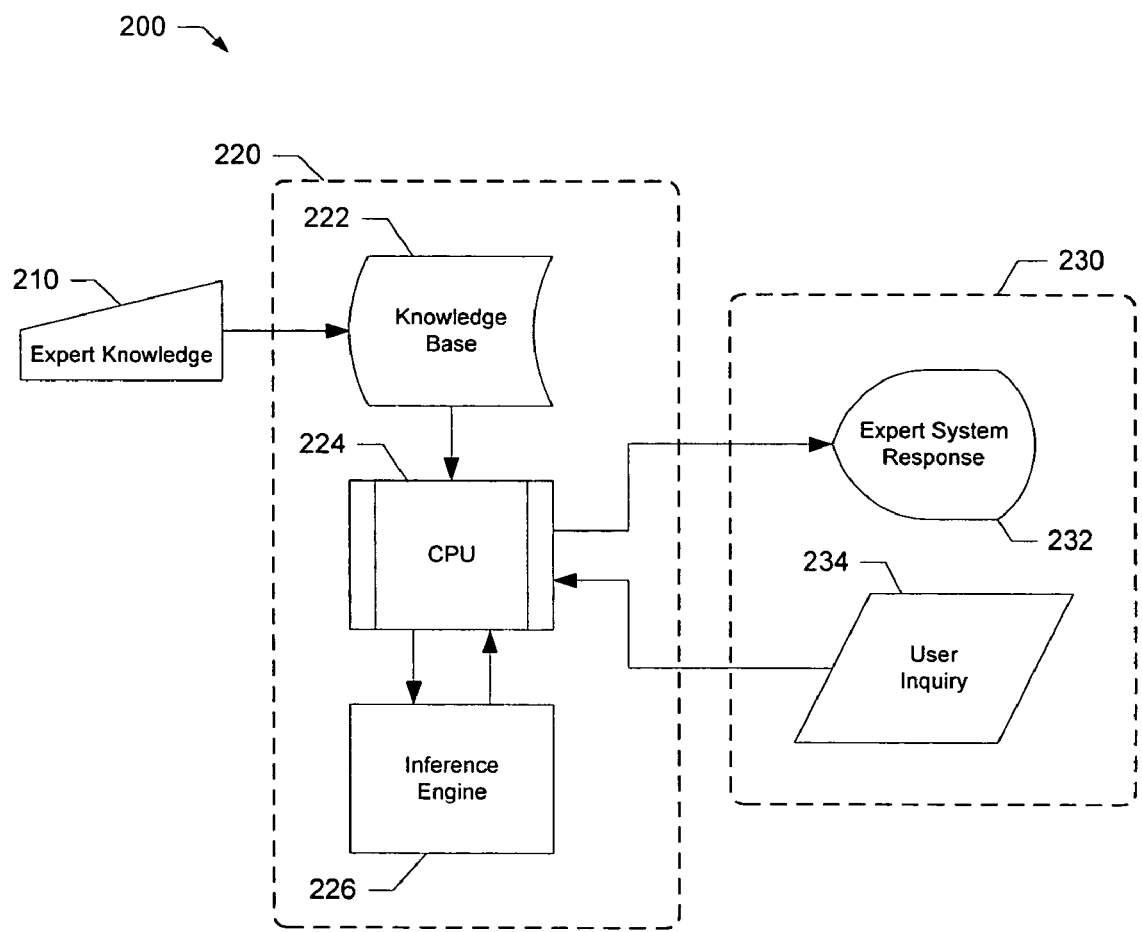
FIG. 2 is a simplified block diagram of a prior art expert system.

FIG. 2 generally illustrates computer implementation of expert system 200. As shown in FIG. 2, traditional expert system 200 bases its operation on inputted expert knowledge 210. The expert knowledge 210 is captured in knowledge base 222 which may be a computer file or database. Knowledge base 222 represents "If-Then" relationships which can be applied to solve problems. In operation, user inquiry 234 is received by expert system host computer 220. Central processor 224 activates inference engine 226 to map selected rules from knowledge base 222 against user inquiry 234. As a result of the application of the rules against user inquiry 234, inference engine 226, under the operation of CPU 224, outputs response 232 based on factors conveyed in the inquiry or other data otherwise available in knowledge base 222. In this scenario, the user and expert system 220 may be said to conduct a dialog 230, which is represented by the dotted box surrounding the user input and expert system output.

Figure 3:
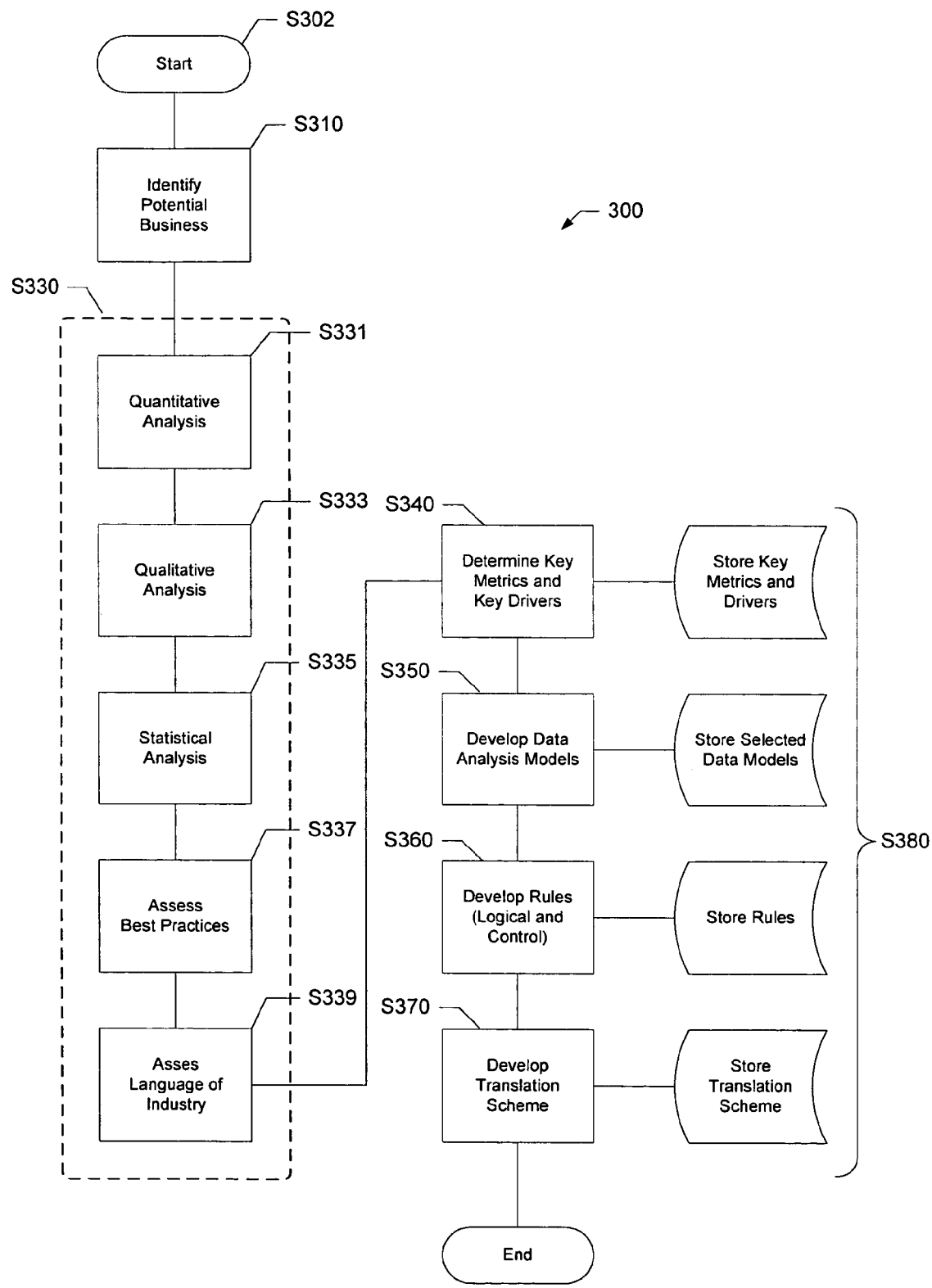
FIG. 3 is a flow diagram of an illustrative process for developing a system in accordance with the present invention.

FIG. 3 generally illustrates the process of developing a system in accordance with the principles of the present invention. In accordance with one embodiment of the present invention, development process 300 starts, step S302, with an objective of identifying a business for which application of the present inventive process is suitable, step S310. The business is assessed to determine whether there is a significant quantity of relevant information about the operation of the business, whether the analysis of that information would be valuable to the performance of the business' employees, and whether the employees likely to have the analytic skills necessary to make use of the data.

System development begins with a thorough evaluation or analysis, S330, of the business by one or more techniques including quantitative analysis, step S331, qualitative analysis, step S333, statistical analysis, step S335, and an assessment of best practices in the industry, step S337. The analysis also includes an assessment of typical operators in the industry for the purpose of designing effective communication techniques, step S339. Although FIG. 3 illustrates the various analyses as being performed sequentially, each of these analyses can be performed in any order, including simultaneously, or may be selectively omitted entirely.

After the business is analyzed, step S330, the results of the analysis are assessed to determine key metrics for that business and the key drivers of those metrics, step S340. As will be described later in more detail, data models or calculations are also developed to facilitate analysis of the data and to make such analysis repeatable, step S350. As a result of the analysis of the business the trends, relationships, and best practices in the industry are reduced to sets of rules, providing advice or recommendations when certain conditions are met, step S360. A presentation scheme is defined for outputting of the analytical results in terms which can be readily understood by a non-analytical operator, step S370. The key metrics, lay metric drivers data models, rules, and presentation scheme are saved to a database or other form of storage, step S380. Although not shown in FIG. 3, the process can also include other steps including steps to define various reports and other aspects of the user interface. The information which is stored as a result of this process development is used later when a system developed according to this process is used to analyze and advise users on the management of the business.

As noted above, one embodiment of the present invention may be viewed as an intelligent advisor which assists in the analysis of available business data, which offers explanations for given results, and which offers suggestions for improving performance. A first aspect of the invention is how to build and program such a system and a second aspect of the invention is the use of such a system in the operation of a business. In the following description of the invention, the description may interchangeably switch between how such a system is built and programmed, and how such a system is used. This is because some structural attributes of the system are more easily described in the context of a functional description of how the system operates when it is in use.

In a first aspect of the invention, a description is provided of a process used to identify industries and job positions in which analytical skills are not job requirements, but having analytic skills would nevertheless benefit job performance. As explained above, one possible set of criteria for identifying a job position which can benefit from the teachings of the present invention are first, that a person who fills the position need not have a strong analytic capability, second, that the job, company, or industry be amenable to objective analysis, and third that analysis of operational data can be beneficial for decision-making.

For example, the job of a supermarket manager is to maintain an optimal product, including ensuring that appropriate quantities of each product are stocked, that seasonal items are stocked or cleared at appropriate times, that price adjustments are rapidly implemented to maintain competitive advantage, and that promotional items and "loss" leaders are strategically identified and timely promoted to maximize overall profit. Traditionally, supermarket managers are skilled at coordinating and supervising the work of store employees and may not be skilled at data analysis and forecasting.

With many thousands of products sold daily, a typical supermarket manager is unable to analyze store performance or profitability on a product by product or seasonal basis. Computer-based cash registers, point-of-sale systems, and perpetual inventory systems as well as customer based discount systems, the quantity and scope of data collected at a supermarket can support very sophisticated analysis. In fact, because many stores track the identity of individual buyers and the items they purchased, customer by customer buying trends can be derived. However, the typical supermarket manager has neither the analytic background nor the computer sophistication necessary to perform a comprehensive evaluation of store sales data. Thus, supermarket manager is an example of a job position in which significant business data is available, but the typical person in such a position has neither the time nor the capability of performing satisfactory data analysis.

Analogously, the manager of an automobile dealership is another example of a job position which could benefit from the present invention. For example, a car sales manager is typically a person having sales experience, as well as experience managing other salespeople. Their skills would likely include people skills, sales skills, and management skills. However, modern automobile dealerships employ computer-based dealer management systems which track and report a myriad of financial and operational statistics about the business. The statistics may include the age of used cars currently in inventory, the price paid for each car in inventory, the blue book sales price for each car, the targeted selling price for each car, the wholesale trade price for each car, as well as historical records for the dealership.

In this environment, if a car sales manager were able to perform a comprehensive analysis of historical sales records and apply the results of that analysis to current inventory, the manager might be better able to forecast which vehicles in his current inventory are likely to sell and/or determine which vehicles should be transferred by wholesale transaction. However, like the supermarket manager, the typical used car sales manager is unlikely to have either an analytic background or the computer sophistication necessary to perform a comprehensive evaluation of sales data.

Thus, both the supermarket manager and the car sales manager exemplify job positions in which significant business information is available, and analysis of such information would enhance job performance, but holders of the job are unlikely to have the analytic skills necessary to make use of the data.

In a first aspect of practicing the method of the current invention, the business to which the invention is to be applied is analyzed. The objective of the analysis is to understand the business, ascertain the type of information that is available for the business, analyze the information from the business, determine how best operators in the business perform, and develop a basis of understanding from which future recommendations can be based. In short, one objective in the study phase is to be able to determine how the industry or company operates. An additional aspect of the analysis is an assessment of the people in the industry or job with an objective of defining ways to communicate analytical concepts to them effectively in a vernacular manner. With regard to the study of the business, as will be explained more fully below, the types of analyses preferably employed include one or more of quantitative analysis, statistical analysis, qualitative analysis and empirical assessment of the practices of the best operators in the industry. While it need not necessarily be so, in a preferred implementation of the current invention, each of these types of analysis are evaluated for applicability and all types may be employed if applicable.

In the quantitative analysis step, data available to the business is reviewed and assessed. Generally speaking, quantitative analysis is an assessment of specific measurable business factors, such as cost of capital, value of assets, and projections of sales, costs, earnings, profits, etc. Such review may begin with an assessment of what data is available to the business, what data is collected by the business, what data should be collected by the business, and how collected data is presently segregated and stored. For example, the assessment may include what types of computer databases are maintained, what types of information are contained in each database, what ranges of dates are maintained for the stored information, and how such databases may be assessed. Similarly, such assessment may include how data is presently employed by the business, what types of forecasts are typically prepared, and how such forecasts are employed by the business. The quantitative analysis step can also include assessment of the data itself to determine the operating performance of the business. For example, traditional ratio analysis can be performed and comparisons of current data can be made against industry standards or averages. One objective of the quantitative analysis is to determine what business data is most relevant to the business decision-making context.

For example, returning to the scenario of a car sales manager, quantitative analysis may show that a dealership maintains detailed sales and inventory records including records of sales price, vehicle cost and profit per vehicle sold. The car sales manager may be evaluated on both quarterly profitability as well as total number of units sold. Similarly, the manager may be evaluated based on the age of the vehicles in his inventory (i.e., the number of days that each vehicle has remained unsold in inventory). Thus, quantitative analysis desirably identifies the metrics that are important to the business and to the measurement of the performance of that business.

In another related aspect of data analysis, historical information from the business is subjected to well-known types of statistical analyses. While statistical analysis may be just a type of quantitative analysis, it is discussed separately here only to segregate the general types of numeric/financial analyses which might typically be performed by a business consultant from the more specialized types of mathematical/statistical analyses which might be performed by a specialist, such as a statistician. The present invention may use the general types of numeric/financial analyses or the more specialized mathematical/statistical analyses or both. The objective of the statistical analysis is to ascertain trends, relationships, dependencies, and/or indicators in the data, which can later be used to project business behavior when applied to current data. As is well known to persons of skill in the area of statistical analysis, the quantity of data required to provide meaningful statistical results will depend on the nature of the data itself. Similarly, where data represents information collected over a period of time, persons of skill in the area of statistical analysis understand the amount of time over which the data must span in order to derive meaningful trends from the data. Of course, the overall quantitative analysis and the more focused statistical analysis may overlap and findings in one area may drive more or less analysis in the other.

While a nearly unlimited range of statistical analyses are known, persons of skill in the area of statistical analysis will be able to select the types of statistical analysis most appropriate for a given type of data. In a preferred implementation of the present invention, various types of statistical analysis are applied to the available data and the results are evaluated to determine which analyses provide meaningful insight into the way the given industry operates.

By way of example and not by way of limitation, the various types of statistical analyses which may be performed include basic statistical analysis such as correlation and covariance, normality test, and tests for equal variances. The types of statistical analyses are also likely to include more sophisticated analyses such as regression analysis including linear regression, polynomial regression, logistic regression, partial least squares, stepwise regression, and best subset regression. Of course, other types of regression including multiple regression may also be appropriate. The statistical analyses may also include analysis of variance. For example, the analysis of variance may include the well-known ANOVA analysis, general linear model analysis, fully nested design analysis, and can include multiple comparisons. As another example, and again not by way of limitation, the statistical analyses can include multivariate analysis. Such multivariate analysis may include discriminant analysis, principal component analysis, cluster analysis, factor analysis, correspondence analysis, auto-correlation analysis, cross correlation analysis, partial auto-correlation analysis, trend analysis, decomposition analysis, and moving average analysis. As a final example, and again not by way of limitation, the statistical analyses can include non-parametric analysis. For example, such non-parametric analyses can include the Mood median test, the Runs test, the Sign test, the Wilcoxon test, the Mann-Whitney test, the Kruskal-Wallis test, and the Friedman test, among others.

Notwithstanding the type of statistical analysis performed, the objective, as noted above, is to ascertain trends or relationships in the data to be used as a basis for making recommendations in support of decision-making in the future. Again, it is considered within the ordinary skill of the art of statistical analysis, to select the type of statistical analyses to be performed and to evaluate whether or not the outcome of the statistical analysis is sufficiently robust as to the reliable and usable.

As will be appreciated, once trends and relationships in the data have been identified, new data can be evaluated in light of these known trends or relationships. For instance, based on the trends and relationships, it may be possible to forecast future data trends and make recommendations based on the forecasts.

Preferably, in addition to numerical quantitative analyses and statistical analyses, the study of the industry will also include qualitative analyses. A qualitative analysis assesses the qualities of a company that cannot be measured concretely, such as management quality, employee morale, subjective preferences or style.

Qualitative analysis can serve many purposes. For example, qualitative analysis may help rank certain behaviors or business outcomes which would otherwise appear to be quantitatively equivalent. By way of example, returning to the scenario of an automobile dealership, many different categories and classes of vehicles may be equally profitable; however, a dealership located in Texas may prefer to stock a greater proportion of trucks. While this preference for pickup trucks may be reflected in a quantitative analysis, this type of subjective preference may be more readily reflected by a qualitative empirical observation.

Finally, notwithstanding the most sophisticated quantitative and statistical analyses and the most comprehensive assessments of best practices, many operators in some industries lack the sophistication and analytic vocabulary to make direct use of the results of the analyses performed. For example, returning again to the automobile dealership scenario, while comprehensive statistical and quantitative analyses can be performed on both historical and current sales and inventory data, the financial figures, statistics and ratios that result from that analysis would be meaningless to a typical car sales manager. Accordingly, an additional aspect of the present invention consists of presenting the output of the analyses in a form and context which is readily meaningful and understandable to a typical operator in the industry.

Whether the data is presented in numerical form, graphical form, pictorial form, or whether the data is presented as a gauge, a signal, an alarm bell, or natural language, the objective is to provide the user with information in a manner that the user will readily understand. As will be appreciated, the presentation of the information will depend on the nature of the operator to whom the communications are made. Understanding a typical operator may include assessing the typical education, vocabulary, analytic understanding, and mathematical ability of an operator, and may also include an assessment of standard terminology or vocabulary used in the industry as well as alternative forms and formats of information presentation. At a minimum, use of plain language and standard industry terminology is preferred.

Thus, after the quantitative analysis, qualitative analysis, and statistical analysis, the key metrics and key drivers are identified which best reflect either the state of the business or trends in the business. In other words, it may be determined that an abbreviated set—as opposed to a comprehensive set—of the financial, statistical, qualitative, or empirical items may be used to monitor, run, and forecast the business without any appreciable compromise in accuracy. In practical terms, by using an abbreviated set of factors, the quantity of information is also reduced to a more manageable level. It is expected that care will be required not to overcome the operator with too much data. Accordingly, in order to be unobjectionable, the data outputted from a system made in accordance with the present invention is preferably limited to a quantity which the user can comfortably digest or reasonably act upon.

For example, analysis of a car dealership might show that one of the most significant factors relating to profitability is the average number of days a vehicle remains in inventory. With this insight, a car sales manager could monitor average inventory age to forecast profitability in the next quarter and to take corrective action when inventory age increases. Significantly, given the insight of the importance of the average inventory age, the car sales manager may be able to take corrective action prior to a financial closing and reporting period in which profits are reported.

The discussion will now turn to some of the steps and techniques which can be used to implement a system in accordance with the present invention.

In the foregoing discussions of quantitative and statistical analysis, it will be appreciated that various types of mathematical operations were performed on raw data in order to compute mathematical results such as sums, products, ratios, percentages, variances, differences, correlation coefficients, etc. Upon evaluation, and as well as following sorting and ranking, it may be found that some of these results provide important information about the performance of the company and/or would be desirable to compute on a regular basis against current operational data. In the following discussion, we shall refer to the mathematical operation or procedure that may be applied to the data as either a "data model" or a "quantitative analytical framework."

In the paragraph above, several simple examples were given of mathematical results which may be important indicators about the business. It should be appreciated that these results may be simple or complex and several or many different types of calculations may be made to assess a single aspect of the business. After all, if the operational data of the business is examined from many different angles and considered in many different ways, it may be found that certain views of the data are more helpful. Of course, it should also be understood that a similar or otherwise identical calculation may be performed on different segments of the operational data. For example, in the auto dealership example, while "profit" may be calculated at the level of the used car department and may be calculated by subtracting cost from revenue, this same calculation may be performed on classes of vehicles such as imports, SUV's etc. Thus, part of the data model can include which data, or which levels of data, the calculation will be applied to.

Once historical information about a business has been evaluated in order to understand that business, the results of that analysis are desirably applied to current operational data to assess the current and forecast future performance of the business. To facilitate this process and to make the process repeatable, in a preferred implementation of the current invention, current operation data may be extracted from locations where operational data is normally stored (in an automobile dealership example, the dealer management system (DMS) database may be used) and pulled into a separate computational environment where various data calculations may be performed. The desirable data analyses or "data models" identified during the data analysis may be implemented in a program so that the desired interaction between the models and rules (discussed below) can be more easily revised and updated.

Exemplary data calculations are described in the context of a car dealership. As noted above, automobile dealerships often use a computer system called a Dealer Management System (DMS), such as those offered by ADP or Reynolds & Reynolds, to collect and manage data associated with the business. There are many different brands of DMS systems and many of the DMS vendors offer different application packages. However, for the purpose of the present disclosure, it is sufficient to note that many of the DMS systems collect, track and/or report information associated with one or more categories of business data and/or may link to other computer systems for extended functionality. For example, a DMS may include:

A capability to collect, track and/or report on customer sales records.

A capability to collect, track and/or report on customer service records.

A capability to collect, track and/or report on parts inventory and manufacturer information.

A capability to access credit records for loan approval.

A capability to collect, track and/or report on vehicle inventory.

A capability to collect and/or report on accounting data.

A customer relationship management (CRM) capability.

A capability to collect, track and/or report on new and used vehicle sales and financing.

A capability to manage parts inventory.

Thus, as a result of an automobile dealership using a DMS, the dealership may have ready access to current and past data associated with one or more of the above-listed categories of information.

Next, a more specific illustrative example of data models will be provided in the scenario of an automobile used car department. As noted above, a used car department of an automobile dealership may maintain certain data about each automobile sold. For example, as illustrated below in Table 1, an exemplary dealership is likely to maintain a summary of vehicles sold in a given period.

TABLE 1

Sales for Week of Jun. 2, 2003

| Date | Sales Record | Model | Sales Price |
|---|---|---|---|
| Jun. 2, 2003 | 5500001 | Honda Accord '01 | $17,100 |
| Jun. 3, 2003 | 5500002 | Ford F-150 '98 | $7,915 |
| Jun. 3, 2003 | 5500003 | Ford Explorer '99 | $10,850 |
| Jun. 5, 2003 | 5500004 | Chevrolet Suburban '00 | $17,380 |
| Jun. 6, 2003 | 5500005 | Nissan Sentra '00 | $7,915 |
| Jun. 7, 2003 | 5500006 | Ford Taurus '01 | $9,385 |
| Jun. 7, 2003 | 5500007 | Ford F-150 '02 | $14,060 |

Moreover, in addition to a summary of each sale, the dealership is also likely to maintain detailed records about each car sold, as illustrated below in Table 2, where such data may extend substantially beyond the sales price.

TABLE 2

Sales Record Detail

| | |
|---|---|
| Sales Record: | 5500001 |
| Model: | Honda Accord |
| VIN: | 1HGBH41JX1N109186 |
| Trim: | LX Coupe 2D |
| Year: | 2001 |
| Color: | Forest Green |
| Mileage: | 28,500 |
| Engine: | V6 3.0 Liter VTEC |
| Transmission: | Auto |
| Options: | Sun Roof, Premium Sound, Rear Spoiler |
| Condition: | Good |
| Sales Price: | $17,100 |
| Acquired: | By trade-in |
| Acquisition Cost: | $11,550 |
| Repair Costs: | $275 |

Data of the type shown in Table 2 would typically be maintained for each vehicle sold. Thus, for each vehicle listed in Table 1, most or all of the data components shown in Table 2 would be recorded. Accordingly, because the DMS system of the dealership records such information about each car sold, it is possible to perform certain calculations. For example, referring to the sales listed in Table 1, it is possible to calculate that total sales during the week of Jun. 2, 2003 was $84,505. Similarly, total sales of domestic cars was $59,590, and total sales of foreign cars was $25,015. These calculations are examples of simple calculations.

As will be appreciated, the simple sales data calculation examples are but a few of the many types of data analyses which might be performed to monitor and report on operational performance of an automobile dealership. Given the range of information which may be maintained in the dealership DMS system, one or more of the following non-exhaustive list of analyses may be calculated for a given period of time:

Total vehicles sold
Total sales revenue
Total cost of goods sold
Total margin earned
Total profit earned
Average margin per vehicle sold
Average margin percentage per vehicle sold
Average profit per vehicle
Average profit percentage per vehicle
Quantity of inventory on hand
Days of inventory on hand
Average age of inventory sold
Average age of inventory on hand
Total number of vehicles sold as percent of inventory
Sales trend
Profitability trend
Used car department gross profit contribution
Return on capital Moreover, each of the above calculations may be performed on either all of the data for the used car department, or, preferably, the calculations can be performed on segments of the data, or both. For example, for the sake of assessing the operations of the business, it may be helpful not only to know total sales for the used car department over a period of time, but it may also be helpful to know sales figures for various vehicle categories. For example, it may be helpful to know sales subtotals categorized by the year of the vehicle (e.g., total sales of model year 2002 vehicles, total sales of model year 2001 vehicles, total sales of model year 2000 vehicles, etc.). Similarly, it may also be helpful to know total sales by price point, total sales for each vehicle within certain mileage ranges, total sales of foreign vehicles, total sales of domestic vehicles, total sales by category of vehicle (e.g., SUV, etc.) total sales by vehicle manufacturer, total sales by origin of the vehicle, etc.

Of course, the data computation results may also be reported in terms of either trends (e.g., sales up X% since last period), differences (e.g., sales $850K higher than last period) or as a relative percentage (e.g., sales equal to 125% of last period sales). Similarly, the data model computation results may also be reported relative to goals or forecasts (e.g., sales $850K higher than forecast for period, or sales 12% above forecast for period). Similarly, the data model computation results may also be reported relative to set thresholds (e.g., sales change since last period equal to 35%, which is greater than an established reporting threshold of 20% change).

It should be noted that just because a data analysis is performed, that does not mean that the results of the calculation are necessarily presented to a user. Instead, as will be discussed more fully below, the rules determine which data analyses are likely to be most valuable and presents them accordingly.

The foregoing discussion provided an overview of data analyses which may be used to analyze the operational data of the business. As will be apparent from that discussion, the number and type of data analyses which may be developed are virtually unlimited and the particular ones used in any specific situation will depend on the nature of the business, the type of data available, and the results of the quantitative and qualitative analysis of the business.

As noted above, the process of the present invention is applicable to many types of businesses where analysis of the business is possible. Thus, while the automobile dealership scenario is used as an example, it should be understood that the teachings herein are also applicable to other businesses such as retail stores (e.g., grocery stores, hardware stores, department stores, discount stores, etc.), construction businesses (e.g., general contracting businesses, building construction businesses, etc.), real estate management businesses (e.g., residential and commercial property management, etc.), service industries, and as other types of businesses without limitation.

Another aspect of the present invention includes the development of rules which are used to analyze data from the organization and to develop recommendations for management based on the data. Ultimately, what may be most helpful to management would be to know: (1) the current situation of the business, in terms of the most important items; (2) why that situation has occurred, in terms of contributing factors; and (3) what steps should be taken to improve future performance. In the present invention, by developing an appropriate set of rules to be applied to operational data, the data may be analyzed to address each of these objectives.

As discussed above, at the beginning of the process the business is analyzed using both quantitative and qualitative means. As a result of this analysis, the principle factors and measurements which are most important to the operation of the business and which are most directly indicative of operational performance (as well as the key drivers of each) are identified. One objective in developing the rules is to capture, in the logic of the rules, the relationships in the data that were identified during the analysis phase.

In a typical implementation, a rule-based expert system comprises a knowledge base and a knowledge base interpreter. The knowledge base includes rules for encoding predefined knowledge about methods of solving problems relating to the particular problem area. The knowledge base interpreter includes a rule interpreter or inference engine for applying the rules to the problem definition. To obtain a problem definition the expert system includes an interface, which may be a means of accessing a data file or a database or may include a user interface for receiving information and instructions from a user, or both. Moreover, the knowledge base may include a facility for generating an explanation of the reasons for the assessment it has made.

The knowledge base can be a computer program written in conventional programming language or in some type of expert system language that is interpreted and executed by the knowledge base interpreter. The knowledge base may store factual or declarative knowledge about the problem area, or both. In a typical prior art output system, the rules also encapsulate procedural knowledge about how to analyze the data.

As noted above, typically, the inference rules are in the form of a conditional statement or "If-Then" statement which specifies that an action or set of actions in the conclusion is to be performed when the condition or set of conditions in the premise is true. For ease of rule interpretation, the premise is typically in the form of a conjunction of logical predicates, each predicate being a logical expression involving the value of one or more parameters. In the context of the present example, the parameters would typically be values that are obtained as a result of computation of the data models.

In prior art expert systems, rules may be used to specify both factual knowledge and control knowledge. Factual knowledge is typically explicit in the rules of an expert system. That is a rule which encodes factual knowledge about the data under consideration may have an action clause that asserts a new fact in response to the premise of the rule being true. Control knowledge may be explicit in the rules of an expert system, but are often implicit in the way the rules base is constructed. For example, an explicit control rule may have an action clause that invokes a procedure or function to load a new set of rules into the expert system. Implicit control knowledge is represented in rules that assert new facts that then may then cause other rules to apply. Implicit control also is present when the ordering of the rules in the rules base affects the outcome.

A rule that encodes control knowledge may, for example, change the selection and ordering of tasks to be performed and/or the order in which various ones of the rules are applied. For example, a rule in a prior art system might be "if the average margin per vehicle is computed to be less than 25 percent, then analyze specific items which are known to be contributing components to margin." Similarly, another rule might be "if average age of inventory is greater than 45 days, then analyze age of inventory by vehicle type and report any inventory type having average age greater than 45 days." Rules of course can also be substantially more complex than the simple examples provided above.

The rules can be used to identify when certain other rules are to be applied when additional data is to be considered or when additional analyses should be performed.

The output from a computer-based embodiment of the present invention may include a high level report which summarizes the most relevant data for an accounting period. For the sake of clarity, such a high level report must be brief and must limit the data which is shown. For example, a first level report for a user may be limited to three to five key subject areas, each of which may report to three to five data items. In one preferred embodiment of a high level report, performance over the past four weeks and performance over the past twelve weeks are reported together with a goal or benchmark for each operational parameter reported. In the used car department, the key subject areas might include areas such as "overall performance," "trade-in performance," "inventory analysis" and "purchased vehicle performance."

Like the analysis step, the application of rules to determine which data to show to the user may include comparing data to established thresholds (e.g., report any item which changes by more than 25% compared to last period). As will be discussed below, the order of presentation of data to the user may be determined based on any number of considerations including, for example, the importance of the operational factor (e.g., used car department gross profit contribution up 5% since last period) or to alert the operator to an unusual situation (e.g., low-mileage SUV trade-in profitability trend down 22% since last period). As noted above, in a preferred embodiment of the present invention, it is desirable to present the most important information to the user first to alert the user to the information which has the most impact and which can most rapidly inform the user of significant developments or trends.

In the foregoing description, a first aspect of the rules was described which pertain to the analysis of the data, to determining what aspects of the data are significant, and to identifying which parts of the data should be shown to a user at the highest reporting level. A second aspect of the development and application of the rules is to ascertain and report why certain results have occurred;-that is, to determine what fundamental drivers have caused the results.

As described above, the quantitative and qualitative analyses that are initially performed may reveal trends or relationships in the data. Additionally, the data models themselves define how certain parameters are calculated. Accordingly, when a numeric parameter is found to be out of line or to have an unusual result, it should be highlighted and brought to the user's attention.

In a preferred embodiment, all of the data models are calculated and then the rules are applied. Alternatively, the models may be arranged in tiers such that a first tier of models can be calculated and then a first set of rules is applied. The first set of rules may provide initial feedback or may identify how additional data models should be run, or both. Thus, in this alternative, the rules may help define which models to run.

As noted above, many operators in some industries lack the sophistication, analytic skills and analytic vocabulary to make direct use of the results of the analyses performed. Accordingly, an additional aspect of the present invention consists of a translation scheme to couch the output of the analyses performed in a form and context which is readily meaningful and understandable to a typical operator in the industry.

As a result of the study of the industry, including steps such as assessing the typical education, vocabulary, analytic understanding, and mathematical ability of an operator, a translation format and vocabulary can be developed for communicating to the user.

For example, while an accountant may be able to readily appreciate a company's condition based on a review of numbers on a balance sheet, a non-accountant may be better able to understand the company's condition if presented with graphical information rather than numerical information. Thus, the "translation" as contemplated herein may include a transformation of the data and a new presentation form. The present inventors do not contemplate any limitation or constraint on how data may be presented in order to communicate most effectively to the user.

Implementation of the translation can be affected by defining and applying additional rules which identify items requiring translation and which specify how such items should be modified for presentation.

In a preferred implementation of the present invention, such translation step may be more than merely stating the results of the analysis in plain English (however, even a translation from technical/financial or statistical terms to plain English is valuable and considered within the scope of an implementation of the present invention). Instead, the results of the analyses are preferably stated in terms in accordance with standard industry usage. Thus, the output of the analysis is like what an operator in the industry would typically use. In referring to this as a "translation" step, the present inventors intend to embrace word and terminology translations as well as translations which affect the form and format in which the data is presented.

Finally, as noted above, whether the data is presented in numerical form, graphical form, pictorial form, or whether the data is presented as a gauge, a signal, or an alarm bell, the objective is consistent—speak to the user in a manner that the user will readily understand. As will be appreciated, the type of translation that will be required will depend on the nature of the operator to whom the communication will be made. At a minimum, use of plain English and standard industry terminology is preferred.

After a particular industry has been analyzed, appropriate data models developed, a sufficient suite of rules created, and a translation scheme defined to interpret and restate the financial or mathematical results into the vernacular of the typical user, a system in accordance with the present invention is ready to be applied in that industry. As will be appreciated, the preferred implementation of the present invention includes a computer system which is programmed with the computer executable instructions necessary to receive data, process data according to the data models and to the rules, translate the output, and output data to a user.

Figure 4:
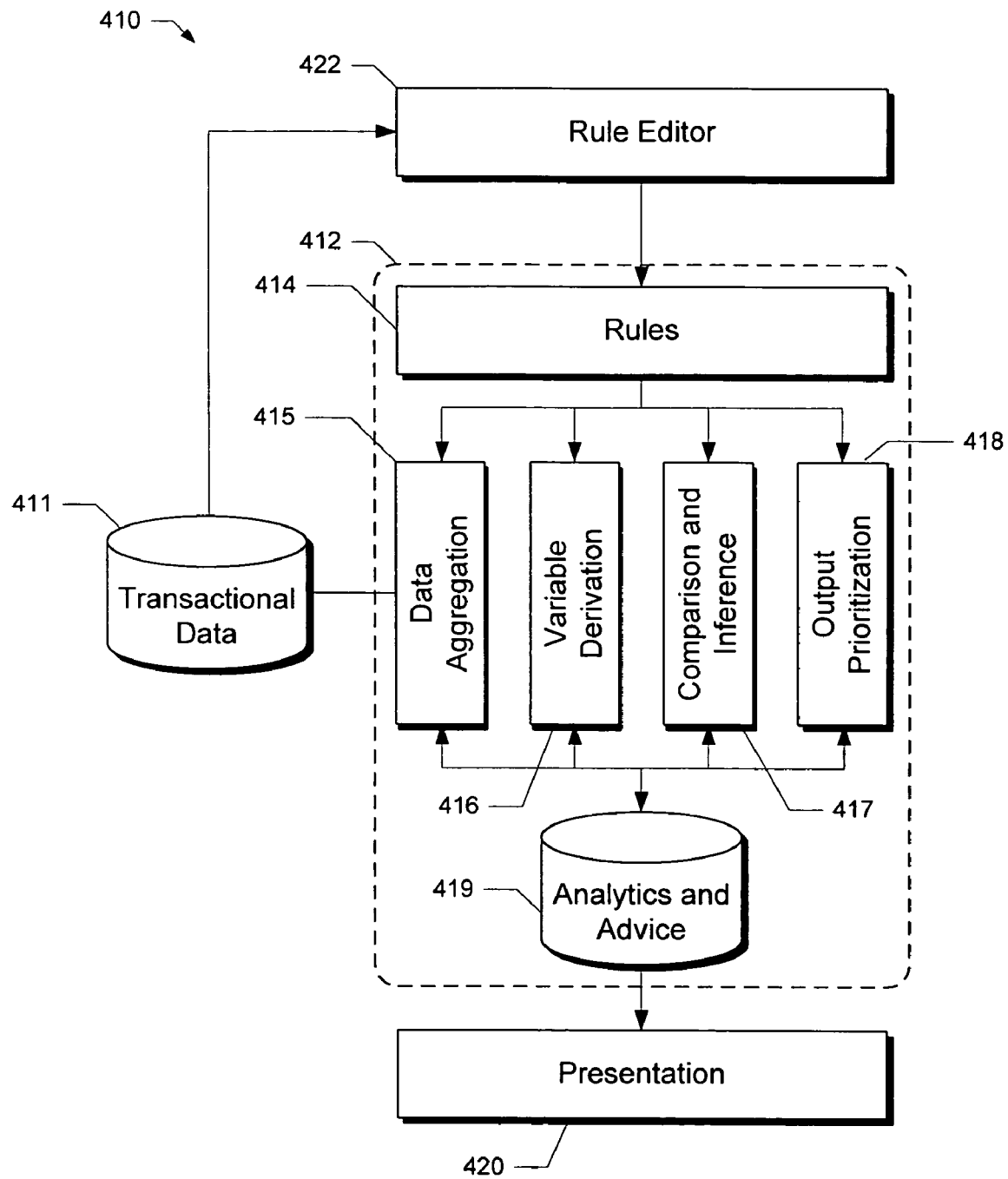
FIG. 4 is a simplified block diagram of an analytic engine of the present invention.

An illustrative embodiment of an analytical system in accordance with the principles of the present invention is described in more detail in conjunction with FIG. 4. Analytical system 400 comprises a number of components including database 411 that provides the collected data, analytical engine 412 that processes the available data to develop advice, and presentation layer 413 which renders the advice for an end user. As is described below, analytical engine 412 is a rule based system, so rule editor 414 is also provided to develop a rule set for a specific application of the analytical system of the present invention.

Database 411 represents a source of the raw data to be analyzed by the system of the present invention. As such, database 411 may represent any form of data input from manual data entry, to a text file, or one or more actual databases. Preferably database 411 represents data already being acquired by an organization, such as data from a point of sale system or inventory management system. For example, database 411 may represent data acquired through a DMS as described above. Database 411 may also include data from an external source such as may be available from an industry-wide trade group or a business consultant. For example, database 411 may include nation-wide data on used car sales and the like.

A key component of system 410 is analytical engine 412. Previously known systems include expert systems and the like which process the raw data and generate inferences based on the data. The inferences are, in essence, additional data to be processed by the expert system to generate still more inferences. Thus, a prior art expert system repeatedly loops over the rules generating additional inferences from the raw data along with previously generated inferences. As the inferences are generated and expanded upon, a general purpose expert system is theoretically able to extract relationships and correlations among the data which may then be used to guide future business decisions. Such general purpose expert systems tend to be slow running unless care is taken to create efficient rule sets. The need to intermix control logic with the factual reasoning logic to improve efficiency tends to make such prior art rule-based expert systems expensive to develop, maintain, and operate.

In contrast with a conventional expert system, analytical engine 412 is designed to decouple the step of generating inferences based on the data from controlling how the data itself is processed. That is, factual reasoning is disentangled from control reasoning. This enables experts to focus on the logical rules and largely ignore control and efficiency issues. It also greatly simplifies and speeds up the operation of analytical engine 412 although, at the loss of some generality.

As shown in FIG. 4, analytical engine 412 is itself made up of a number of component pieces. In overview, analytical engine 412 comprises rule module 414, aggregation module 415, variable derivation module 416, comparison and inference module 417, prioritization module 418, and database module 419. Associated with analytical engine 412 are rule editor databased 411 and presentation module 420. Each module will be described below in turn.

In general, the component modules of analytical engine 412 operate in sequence, such that each module processes the output of the preceding module. For instance, data aggregation module 415 processes the raw data available from database 411. Then variable derivation module 416 processes the output of aggregation module 415. Analogously, inference module 417 and prioritization module 418 process the output of the preceding modules. Prioritization module 418 sends the final output, typically business advice, to presentation module 420 to be rendered in a form usable by the end user.

Figure 5:
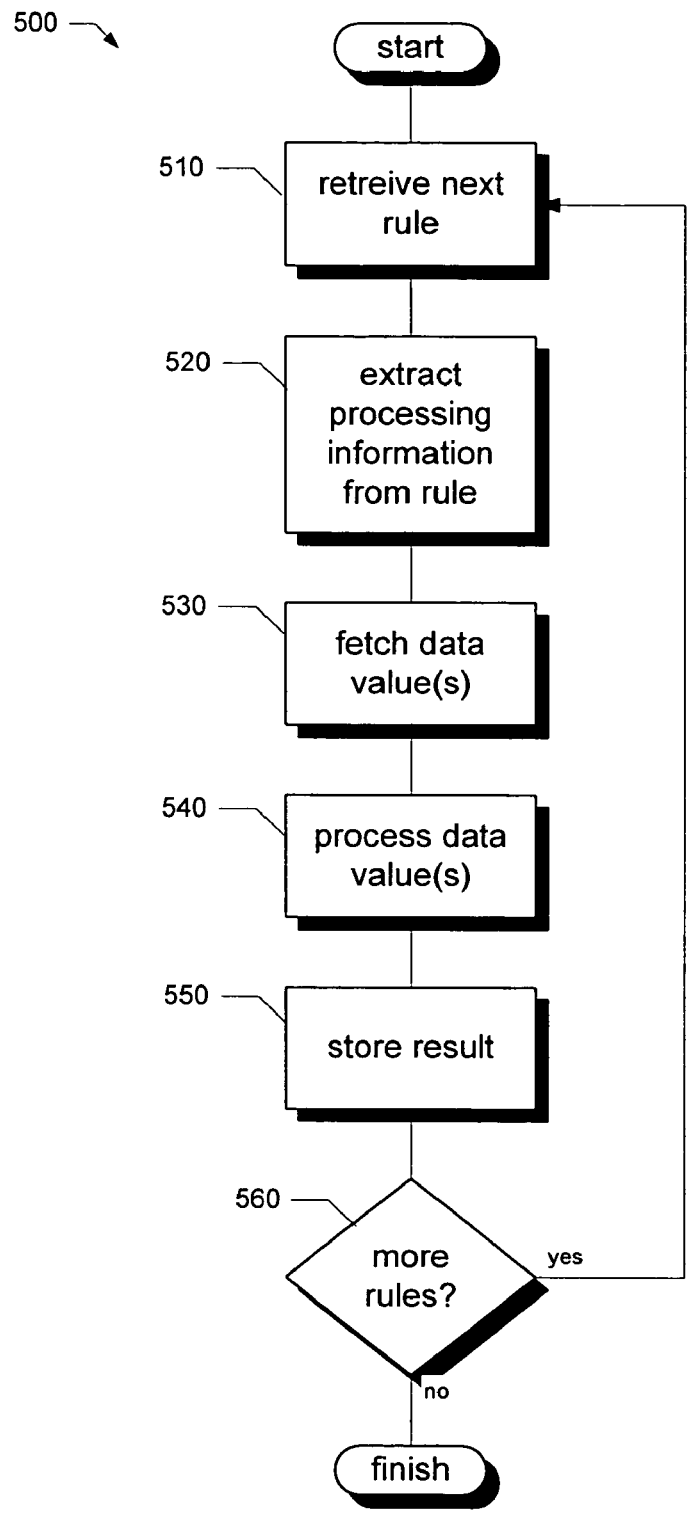
FIG. 5 is a flow diagram representing the operation of a module of FIG. 4.

Aggregation module 415, variable derivation module 416, inference module 417, and prioritization module 418 share a similar procedural structure as shown by simplified flow chart 500 of FIG. 5. In general, each module retrieves a rule from rules module 414, S510. The rule is then parsed to determine the data to be processed and the operation to be performed, S520. The relevant data is retrieved from database 411 or 419 as applicable, S530, and processed, S540, in accordance with the rule. The results are then stored, S550, for example in database 419 so that they will be available to subsequent modules. If there are more rules relevant to the current module in rules module 414, then the next rule is retrieved and processed in the same way, S560. Each rule is processed in turn to analyze some data in the system and to calculate some result for later stages of processing. When all rules have been processed, the current module terminates, and control passes to the next module for processing as needed.

The diagram of FIG. 5 is a conceptual representation of the processing of analytical engine 415. One skilled in the art will recognize that various modifications, enhancements, and optimizations may be made without altering the concept represented by FIG. 5. For example, the inference rules contain the information necessary to derive the operations and data to be applied by the aggregation module 415, variable derivation module 416, inference module 417, and prioritization module 418. FIG. 5 suggests that each module in turn re-parses all of the inference rules to extract the information necessary for the operation of the module. As an optimization technique, a preprocessing step may be added to parse the inference rules once to extract and store the information needed by each module so that the individual modules need only retrieve the preprocessed rule information applicable to that module.

Referring back to FIG. 4, analytical engine 410 begins by processing the raw data through aggregation module 415. Aggregation module 415 retrieves the raw data from the records maintained by the client. Such data may come from a point of sale system, inventory management system, accounting system, legacy DMS, or the like. While any of the data is potentially useful in deriving advice, the raw data of an individual event or transaction is not likely to be significant enough to form a basis for providing advice. To provide more useful information, the raw data is processed to calculate aggregate values that characterize the raw data in a more abstract manner. For example, in a used car dealership, the raw data of individual car sales and trade-ins may be processed by aggregation module 415 to calculate average gross profits over the previous three months, the average net profit for a specific type of vehicle, or any other calculation that may be useful in developing a performance metric.

In accordance with the principles of the present invention, the calculation of aggregate values is driven by the inference rules in rules module 414 as is described herein below. Advantageously, this may reduce the amount of processing performed because only those aggregate values actually referenced by a rule need to be calculated by aggregation module 415. However, it may be more efficient to calculate a predetermined set of aggregate values even if some are never referenced by a rule. The aggregate values are then stored to database 419 for use in subsequent processing by analytical engine 412.

Typically, an aggregate value by itself is not of as much interest in generating advice as is the relationship between different aggregate values. For instance, in the exemplary used car dealership, the average gross sales for a quarter may be important information; however, for the purposes of generating advice, the trend in average gross sales, e.g., this quarter's average gross sales in comparison to last quarter's, is a more useful metric. Variable derivation module 416 processes the aggregate values to calculate such derived values, also called key indicators. Typically, the key indicators are calculated by applying an operation, such as taking a ratio or difference, between two or more aggregate values or target values. For example, a key indicator may be the ratio of last month's unit sales to the current month's unit sales expressed as a percentage, or the change in average gross profit compared to last month. As will be described herein below, the calculation of key indicators is also driven by the rules provided by rule module 414.

In general, aggregate values and key indicators are selected as part of the initial business analysis by a business analyst familiar with the industry and problem area being addressed. For most organizations, this would be someone hired to analyze the business's performance and make recommendations. Moreover, applications of the analytical engine of the present invention would tend to be developed iteratively and incrementally, and as the system evolved over time, different aggregate values and key indicators would be identified and calculated.

The key indicators calculated by variable derivation module 416 are then compared to predefined thresholds, benchmarks, and/or ranges by comparison and inference module 417. For instance, responsive to rule, inference module 417 may determine if the percent ratio (a derived value) of average gross profit during the last 90 days (an aggregate value) to the average profit of certified cars during the last 90 days (another aggregate value) is greater than 5% (a threshold). The comparisons determine which specific pieces of advice are applicable based on the available information.

Prioritization module 418 then ranks the applicable advice identified by inference module 417. In one embodiment of the invention, prioritization module 418 has a relatively simple architecture. Each advisory that is generated by a successful rule is assigned a priority number. This priority number then carries over to the advisory generated by that rule if it applies. The activated advisories may then be sorted based on the assigned priority number. To assist in organizing and prioritizing a system having many advisories, the advisories may be organized into categories, so that within each category the advisories are sorted by priority number.

The priority number associated with an advisory may be assigned a priori by an analyst based on his or her assessment of the importance of the problem it addresses. Alternatively, more automated and sophisticated methods might be used to assign priority numbers to rules. Gap analysis, sensitivity analysis, or other techniques may be applied to determine which advisories, if followed, would provide the greatest performance improvement. Those advisories having a larger impact would then be assigned a correspondingly higher priority. For example, if an advisory is generated based on the low number of cars sold for a month, the additional profit to be gained by bringing the number sold into compliance with the target would be calculated. Then such calculated potential increase in profits could be used as a priority for the corresponding advisory. This would result in the advisories being sorted in order of greatest expected economic benefit.

As yet another alternative, a history of the advisories that have been generated may be maintained. If a problem appears to persist over time its priority may be boosted relative to other advisories. As described below, not all generated advisories are shown to the user. By boosting the priority of long standing advisories, long-term, systemic, but low priority advisories would periodically be provided to the end user.

After processing by prioritization module 418, the advisories are then passed to presentation layer 420 to be rendered for an end user. Typically, the advisories are displayed as text on a computer monitor or printed on paper in the form of a report, or the like. However, other forms of presentation may also be used. For example, advisories may be delivered by e-mail or converted to speech for delivery by cell phone.

Figure 6A:

Illustrative advisory displays provided by presentation layer 420 are shown in FIGS. 6A and 6B. These displays represent information and advice that may be presented based on transactional data collected at a hypothetical car dealership including both new and used cars. FIG. 6A is an illustrative scorecard display for the sales of new cars from the dealership. Whereas FIG. 6B is for used car sales. The displays of FIGS. 6A and 6B are generated and displayed by presentation layer 413 itself using various elements of a graphical user interface as is known in the art. Alternatively, presentation layer 420 may format the advisory information provided by prioritization module 418 into HTML or XML for rendering by a web browser or other application.

FIGS. 6A and 6B each include areas for displaying basic information such as name 631 of the organization and date 632 that the report was created, and may also include branding indicators such as logo 633 and the like.

The information may be organized in various manners. For example, broad categories of information may be segregated by page, as shown in FIGS. 6A and 6B, wherein new car and used car information are shown on separate pages. In addition, within each page, the relevant information may be further organized into categories and displayed in specific areas of the display screen. The key data and advisory information displayed in FIG. 6A is organized to display general information applicable to new car sales as well as summary information organized by car type, e.g., coupe, sedan, SUV, etc. FIG. 6B also displays general information relevant to used car sales, but also organizes transactional information by the source and/or destination channels in areas 637-639.

For example, information on the overall sales of cars is shown in area 634 and information about aging inventory is shown in area 635 in both Figures. Area 636 of FIG. 6A shows a summary of the sales performance of various makes and models of new cars. Areas 637-638 of FIG. 6B show information relevant to user cars that are obtained by purchase and by trade-in. Area 638 also shows information about trade-ins that are subsequently disposed of through the wholesale channel.

As shown in FIGS. 6A and 6B, the display areas may include sub-regions. For example, area 634 includes a region for displaying text advisories and a region for displaying relevant numerical information. The screen space for displaying the textual advisories may be limited. Therefore, presentation module 420 is preferably configured to display as many of the highest priority advisories as will fit within the allocated space. Alternatively, scrolling text boxes or other display techniques may be used to display textual information in a limited screen space.

As described herein above, the system of the present invention is largely driven by the inference rules. These rules are typically created by a business analyst or consultant. It is expected that a consultant can create a system generally applicable to a particular business segment, and may then market the system to applicable businesses. For example, a consultant may create a system applicable to car dealerships. Assuming that the rules are applicable to car dealerships in general, the consultant could then sell the system to multiple car dealerships with little or no customization required. This effectively enables the analyst to amortize that effort and expense of capturing the knowledge and creating the analytical tool over multiple clients within an industry sector.

Of course, the analyst/consultant should have specific knowledge and expertise in the field for which the system is being created. Based on that knowledge, the analyst selects aggregate values and key indicators that are likely to be relevant in providing advice to the end user. The rules may be developed based on empirical evidence, theory, rules-of-thumb, or other foundation as desired by the analyst. Separate data mining techniques may be used to discover new correlations among the data available to the analyst.

Figure 7:
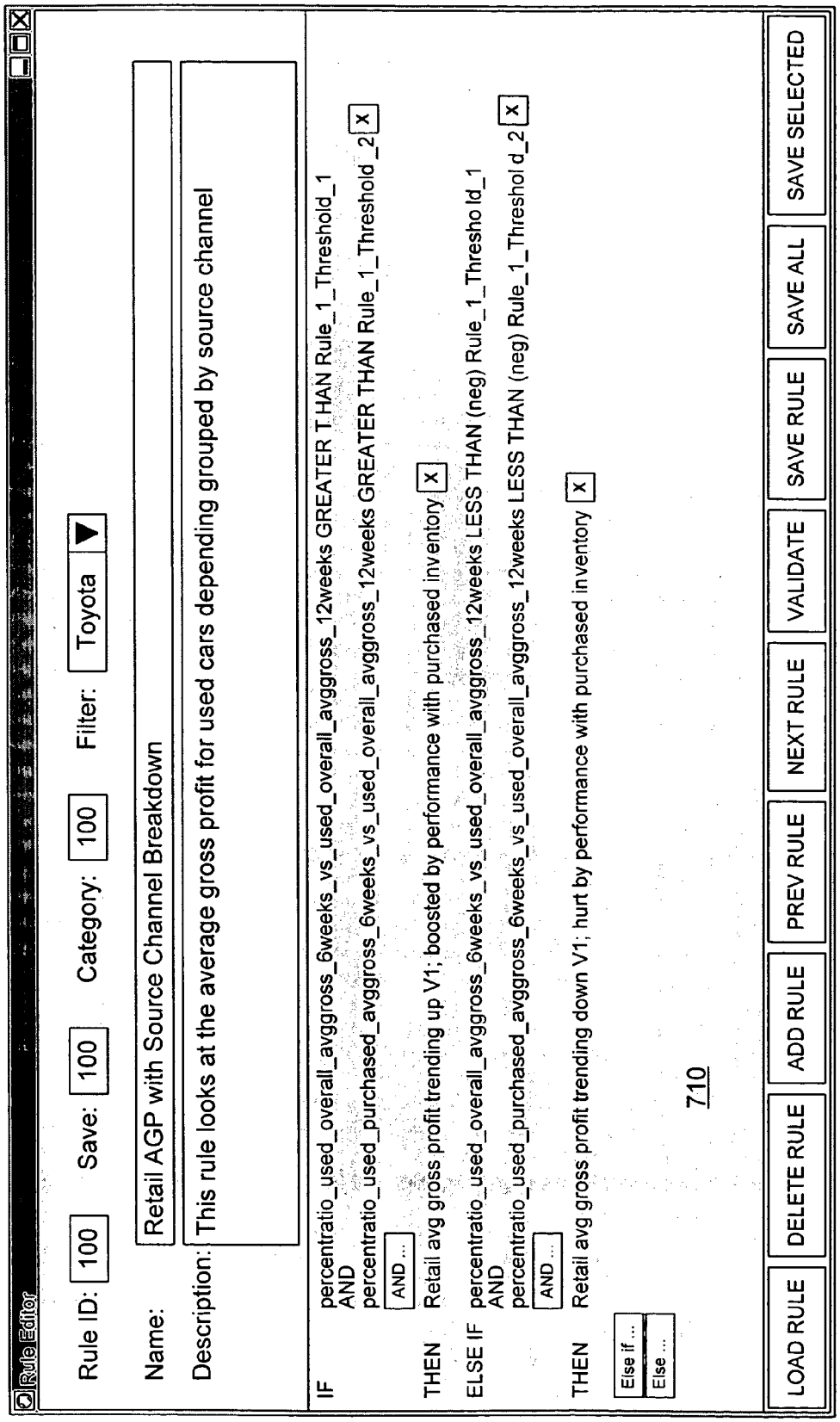
FIG. 7 is an illustrative screen display of a rule editor.

The analyst/consultant then uses the defined aggregate values and derived variables to formulate the rules for selecting analytical advice for the end user. Preferably, the rules are created using a purpose built tool or program. Such a tool is shown in FIG. 7, and represented by rule editor 422 in FIG. 4. However, in the preferred embodiment of the present invention, the rules are stored in an XML-based format. Accordingly, it may be possible to create and modify the rules using a text editor rather than a special rule editor.

Rule editor 710 of FIG. 7, is an illustrative rules editor employing a graphical point and click type of user interface. Such an interface enables the analyst/consultant to easily build rules that encapsulate their expert knowledge. In accordance with the principles of the present invention, a rule takes the form of an 'If-then' statement in which a previously calculated key indicator (or derived variable) value is compared against a previously defined threshold or range. If the comparison is satisfied the advisory statement indicated in the 'then' part of the rule is output by the inference module as being relevant based on the available data. However, if the comparison is not satisfied, then the advisory in the 'then' clause is skipped and the next rule or portion of a rule is tested. As described above, the advisories are then sorted and presented to the user in a useful manner.

Figure 8:
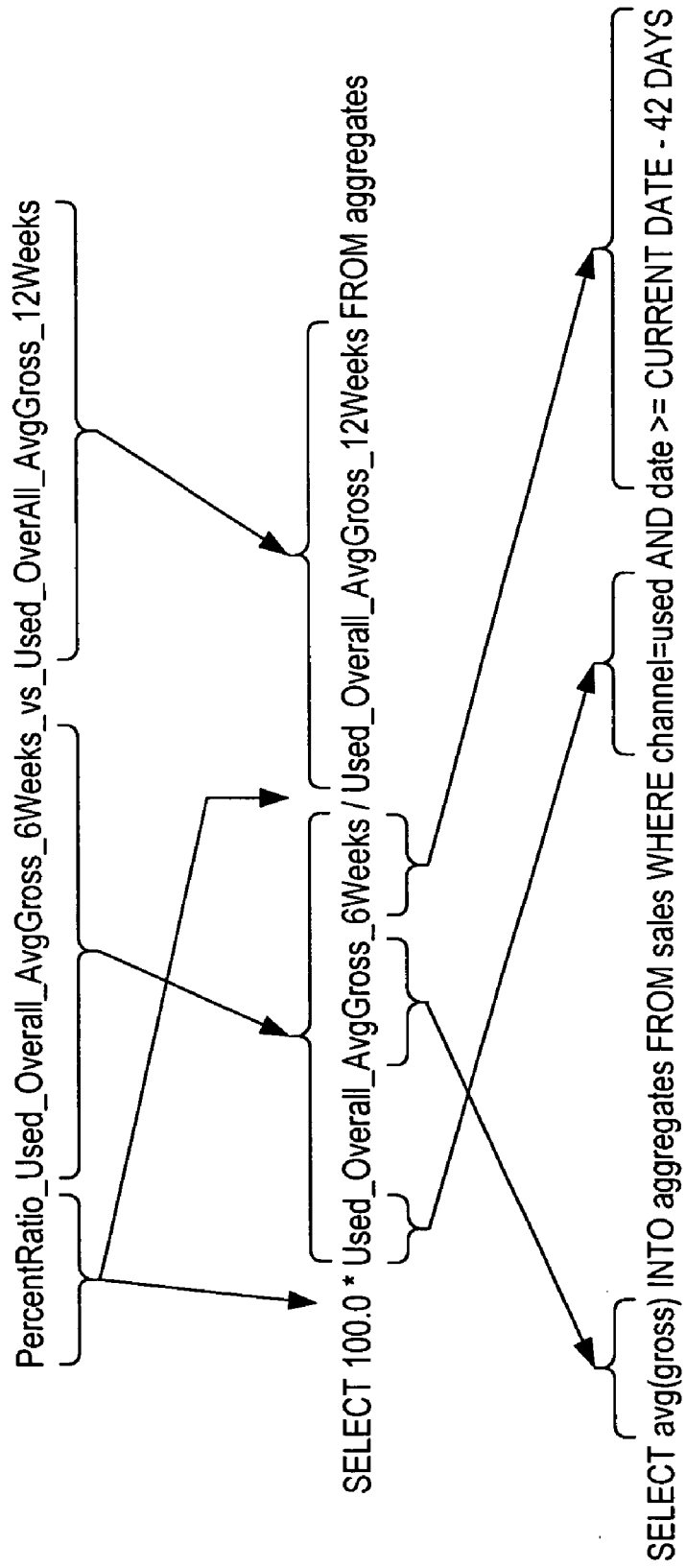
FIG. 8 illustrates the decomposition of a variable name to derive the database query used to calculate the value of the variable

In creating the rules, the key indicator values are selected from a list of available key indicator values. As shown in FIG. 7, the key values preferably have names indicative of how the values are computed. For example, in FIG. 7, key indicator 712, named: 'PercentRatio_used_overall_avggross_6weeks_vs_used_overall_avggross_12weeks' indicates that the value is computed as the ratio, expressed as a percentage, of the aggregate values 'used_overall_avggross_6weeks' and 'used_overall_avggross_12weeks.' The names of the aggregate values also suggest how they are calculated. For example, 'used_overall_avggross_6weeks' is the 6 week average gross over all used cars, and 'used_overall avggross_12weeks' is the 12 week average gross over all used cars. The use of a structured naming technique provides a convenient mechanism for mapping key values and aggregate values to the code, e.g. the database SQL query, that calculates the corresponding key value or aggregate value. An illustrative mapping from an inference rule to the calculations needed to obtain the key indicators and aggregate values is shown by the brackets and arrows in FIG. 8.

In a preferred embodiment of the present invention, inference rules written by an analyst have a strict format. Referring back to FIG. 7, the left-hand or test side of each rule compares derived variables or key indicators with predefined target values-or ranges. The right-hand or action side of each rule provides an advisory. Typically, the advisories include a mechanism, e.g., string formatting or parameter passing, for incorporating calculated values into the advisory.

As the analyst builds each rule, he or she selects the derived variables, targets and ranges from a list of existing values. Using a graphical rule editor, these items may be selected from menus or drop down lists, and the like. The selected values may be combined using logical operators such as 'and', and relational operators such as 'greater than' or 'less than' to create the test part of a rule. A text entry box may be used to input an appropriate advisory to be issued when the test is satisfied. Rules created using the rule editor are then saved to be used by inference engine 417. In a preferred embodiment, the rules are saved in an XML format such as that shown in FIG. 9.

Occasionally, a new aggregate or derived value may be needed. In such a case, the analyst creates and specifies the calculation of the required value by selecting and combining existing aggregates and derived values with the appropriate operators. In one embodiment of the invention, the new value is assigned a name indicative of the calculations required to obtain the value. The new name is incorporated into the inference rule the analyst is building. When the analytic engine of the present invention is subsequently executed, the aggregate module or derived value module, as applicable, parses the variable names in the inference rules to determine what values need to be calculated and how to calculate them. In the case of aggregate values, the variable names map to a database query to retrieve the desired aggregate value. In the case of derived values, the variable names map to an expression that may be evaluated to calculate the derived value.

In an alternative embodiment of the present invention, the definition of a newly defined aggregate or derived value is stored as a separate 'rule' or definition, for example, as portion of an XML structure. Such rules are processed by the derived variables or key indicators module of FIG. 4 to calculate the needed value.

The testing of all logical conditions is segregated into inference module 417. This means that inference module 417 does not have to be able to deal with rules containing complicated logic. Evaluating an inference rule is essentially looking up and performing Boolean operations on previously calculated values. A lot of the speed and simplicity of the analytical engine is due to the fact that the rules essentially embody "straight line" code.

Eliminating looping from the rules is necessary to break rule execution into separate phases as in the architecture of a system of the present invention. But the absence of loops in particular poses a problem with regard to rule authoring. Some of the rules may apply to many categories of data. For example, an analyst may want to compute as key indicators the average profits for Ford Mustangs, Honda Accords, Chevy Cavaliers, etc. Because there are hundreds of makes and models of cars, it would be extremely tiresome to write each rule separately. Accordingly, the rule editor of the present invention allows an analyst to create rules based on classes of categories rather than on individual categories. For example, a single rule meta-rule may be written that applies to each make and model of car rather than separate rules for Ford Escorts, Mazda Miatas, etc. The rule authoring tool then processes these "meta-rules" by systematically substituting each individual category for the class of categories. In other words, the tool derives a large set of individual rules from the meta-rule.

It should be understood that all computations of a given type, e.g. aggregate value derivation or key indicator calculation, are executed at the same time, regardless of which inference rules they might be derived from.

The system of the present invention provides a relatively simple and rapid method of analyzing available information and providing advisories based on that information and analysis. Preferably, various optimizations may be included in the system to further improve system performance. For example, in a system of any appreciable size, there may be hundreds of available types of raw data, and an exponentially large number of possible aggregate values that could be calculated. Parsing the inference rules to determine which values to calculate advantageously limits the calculations to only those calculations relevant to the analysis of the raw data. For example, the inference rule of FIG. 9, refers to the value of 'percentratio_used_overall_avggross 6weeks_vs_used_overall avggross__12weeks', thus analytical system 410 can infer that the average gross used car sales over the last 6 weeks (used_overall_avggross__6weeks) needs to be calculated by data aggregation module 415. Values that are not referenced in the rules need no be calculated.

Another means of optimizing the analytical engine of the present invention is to skip calculations based on missing or low quality data. Database queries provide the values of aggregate variables, targets, and thresholds. If the data to support an aggregate variable are unavailable or of low quality, then a null value indicator, in many cases just 0, is returned. As the rules for computing derived variables and key indicators are processed, if one of the input variables is unavailable or is of low quality, a null value indicator, e.g. 0, is produced. Because the computation of aggregate values and key indicators involve simple arithmetic, calculation with the null values is not computationally expensive. However, when a null input value is encountered while processing the inference rules, the null value is equivalent to a "false" Boolean value. Because the inference rules are conjunctions of multiple conditions, the presence of a null implies that the remaining conditions need not be checked, and that the rule cannot apply.

Other optimizations include conditionally including or excluding certain derivation and comparison/inference rules based on the needs of the particular client. For example, a Toyota dealership may not be interested in monthly sales of new Ford cars. Therefore, the analytical engine is preferably configured to load selected rules or sets of rules as may be applicable for a given installation. This can dramatically decrease the total number of rules that need to be loaded into the analytic engine for a given client. Such a feature enables a business consultant/expert to develop rule sets generally applicable to an industry or field, e.g. car sales, yet custom tailor a specific installation of the analytic engine to meet the needs of a specific client in that industry or field, e.g., a Toyota dealership.

As persons of skill in the computer programming and computer hardware fields are aware, operations such as those described above can be implemented in a wide variety of programming languages, including both high and low level languages, and each of the functions (or portions of the functions) can be written in separate modules and/or different languages. Moreover, while the overall process of receiving data, processing data, and outputting data can be performed by a single computer, these functions may also be apportioned between and among several computers.

In a first aspect of using a system in accordance with the present invention, current and/or past operational data must be provided for analysis. As persons of skill in the computer programming arts are aware there are numerous techniques for providing data to an application program, all techniques of which are considered potentially appropriate for use with the present invention. In a preferred embodiment of the present invention, the application program representing the intelligent adviser according to the present invention accesses or is provided access to operational data which may have been saved in one or more existing databases. For example, in the situation on automobile dealership, the dealership DMS system may store a wide variety of data in one or more databases.

According to the programming techniques used, the data from the dealership DMS database may either be accessed directly or, alternatively, the data may be exported from the DMS database and mirrored in a second database or other data file format for the purpose of being accessed by the intelligent adviser application.

Finally, while one embodiment of the present invention is envisioned as a report and advising system, other embodiments of the present invention may be integrated into other computer applications which are used to implement operational decisions made by the user. For example, returning to the scenario of the automobile dealership used car department, if a system in accordance with the present invention is used and the output from that system suggests that the dealership has an excessive quantity of aging inventory, an integrated computer application might allow the user to directly flag the identified items of aging inventory for transfer to a wholesale auction for disposal. Similarly, if the output of the analysis system in accordance with the present invention indicates an insufficient inventory of a particular type of vehicle, an integrated application implementation may allow the business user to automatically generate a purchasing report to be used at the next wholesale auction. Still further, the degree of integration may be taken to a further level and, for example, flagged excess inventory may be automatically offered for sale via an electronic communication. Similarly, in the event that the system indicates an insufficient inventory of the particular vehicle type, a highly integrated system, upon user indication or automatically, may transmit purchasing instructions via an electronic communication.

The present invention is not limited to the specific examples described and typical variations within the ordinary skill in the area also considered to be within the scope of the present invention. Although the present invention has been fully described by way of examples with reference to the accompanying drawings, it is to be noted that various changes and modifications will be apparent to those skilled in the art. Therefore, such changes and modifications should be construed as being within the scope of the invention.

What is claimed is:

1. A computer implemented knowledge-based system for providing advisories to a user on the operation of a business, the system comprising:
   a database of inference rules relevant to the business;
   a source of input data about the business operations;
   an output for rendering advisories for the user; and
   a processor programmed to:
      analyze predicates of the inference rules to identify data to be processed and operations to be performed prior to applying the inference rules;
      process the input data to calculate a plurality of aggregate values based on the analysis of the predicates, wherein the aggregate values are derived from the input data and characterize the input data;
      process the aggregate values to calculate a plurality of key indicators based on the analysis of the predicates, wherein the key indicators are derived from the aggregate values and the key indicators represent a relationship between different aggregate values;
      apply the inference rules to the aggregate values and key indicators to generate the advisories; and
      to output at least some of the advisories on the operation of the business to the user.

2. The system of claim 1, further comprising a data store for storing the plurality of aggregate values and the plurality of key indicators.

3. The system of claim 1, wherein the plurality of inference rules comprise 'if-then' rules.

4. The system of claim 3, wherein the processor determines rules for calculating the aggregate values and key indicators and stores the rules in the database.

5. The system of claim 3, further comprising a rule editor, the rule editor providing a means of creating, editing, and saving the plurality of rules.

6. The system of claim 1, wherein the advisory messages comprise natural language messages.

7. The system of claim 1, wherein advisory messages are assigned a priority, and the processor is further programmed to prioritize the advisory messages.

8. The system of claim 1, wherein the processor is further programmed to group the advisory messages into predetermined categories.

9. The system of claim 7, wherein the priorities are assigned a priori to each advisory.

10. The system of claim 7, wherein the priorities are determined responsive to a determination of the effect of a variation in an aggregate value or key indicator on a predefined metric.

11. A computer-implemented method of analyzing numerical data indicative of the operation of an enterprise and providing advisories to a user relevant the operation of the enterprise, comprising:
   providing a plurality of inference rules regarding the operation of the enterprise;
   analyzing the plurality of inference rules to determine key indicators relevant to the operation of the enterprise and to determine aggregate values needed for calculating the key indicators;
   processing the numerical data to calculate the determined aggregate values, wherein the aggregate values are derived from the input data and the aggregate values characterize the input data;
   processing, with a computer, the aggregate values to calculate the plurality of key indicators, wherein the key indicators are derived from the aggregate values and the key indicators represent relationships between different aggregate values;
   comparing the key indicators with predefined thresholds or ranges; and
   outputting advisories relevant to the operation of the enterprise responsive to the comparisons to the user.

12. The method of claim 11, further comprising storing the plurality of aggregate values, the plurality of key indicators, and the predefined thresholds or ranges in a database.

13. The method of claim 11, further comprising storing the plurality of inference rules in a rule database, wherein the comparisons are performed responsive to the inference rules.

14. The method of claim 13, further comprising storing rules for calculating the aggregate values and key indicators in the rule database.

15. The method of claim 14, further comprising deriving the rules for calculating the aggregate variables and key indicators from the inference rules.

16. The method of claim 13, further comprising providing a means of creating, editing, and saving the plurality of inference rules.

17. The method of claim 11, wherein the analytical results comprise advisory messages and the method further comprises selecting an advisory message responsive to the comparisons.

18. The method of claim 17, wherein the advisory messages comprise natural language messages.

19. The method of claim 17, wherein advisory messages have an associated priority, the further comprising prioritizing the advisory messages.

20. The method of claim 19, wherein the advisory messages are grouped into predetermined categories.

21. The method of claim 20, further comprising prioritizing the advisory messages within each category.

22. The method of claim 17, wherein the priorities are assigned a priori to each advisory.

23. The method of claim 17, further comprising determining the priorities responsive to a determination of the effect of a variation in an aggregate value or key indicator on a predefined metric.

* * * * *

UNITED STATES PATENT AND TRADEMARK OFFICE
CERTIFICATE OF CORRECTION

PATENT NO. : 7,577,634 B2  
APPLICATION NO. : 10/912508  
DATED : August 18, 2009  
INVENTOR(S) : Ryan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 521 days.

Signed and Sealed this

Seventh Day of September, 2010

David J. Kappos  
*Director of the United States Patent and Trademark Office*